(12) United States Patent
Zarganis (10) Patent No.: US 11,325,028 B2
(45) Date of Patent: *May 10, 2022

(54) PRO GAMING AR VISOR AND METHOD FOR PARSING CONTEXT SPECIFIC HUD CONTENT FROM A VIDEO STREAM

(71) Applicant: Sony Interactive Entertainment LLC, San Mateo, CA (US)

(72) Inventor: John Charles Zarganis, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,448

(22) Filed: Jun. 30, 2020

(65) Prior Publication Data

US 2020/0384357 A1 Dec. 10, 2020

Related U.S. Application Data

(63) Continuation of application No. 15/921,141, filed on Mar. 14, 2018, now Pat. No. 10,695,667.

(51) Int. Cl.
*A63F 13/26* (2014.01)
*A63F 13/533* (2014.01)
(Continued)

(52) U.S. Cl.
CPC ............ *A63F 13/26* (2014.09); *A63F 13/213* (2014.09); *A63F 13/2145* (2014.09); *A63F 13/42* (2014.09); *A63F 13/533* (2014.09); *A63F 13/537* (2014.09); *A63F 13/803* (2014.09); *G02B 27/0172* (2013.01); *G02B 27/0179* (2013.01); *G06T 19/006* (2013.01);
(Continued)

(58) Field of Classification Search
USPC .......................................................... 463/32
See application file for complete search history.

(56) References Cited

U.S. PATENT DOCUMENTS 9,285,589 B2   3/2016   Osterhout et al.
9,639,989 B2   5/2017   Ohashi
(Continued)

FOREIGN PATENT DOCUMENTS

CN      106383587 A       2/2017
JP      2014010664        7/2015
(Continued)

OTHER PUBLICATIONS

Hartescu et al., "Gaze tracking as a game input interface", Computer Games (CGames), 2011 16th International Conference on IEEE, Jul. 27, 2011, pp. 126-133.

*Primary Examiner* — Pierre E Elisca
(74) *Attorney, Agent, or Firm* — John L. Rogitz (57) ABSTRACT

A wearable or mountable visor or display apparatus capable of presenting augmented reality (AR) content. The primary intent of the AR visor is to parse and selectively display desired heads up display (HUD) content from a video stream or video game such as a map, timer or clock, speedometer/tachometer, instrumentation panels, or similar context-sensitive information relevant to a video game or stream. The AR visor allows a user to configure and display various content on one or more designated sections of the AR visor/display.

20 Claims, 8 Drawing Sheets

(51) Int. Cl.
  *A63F 13/537* (2014.01)
  *A63F 13/803* (2014.01)
  *A63F 13/2145* (2014.01)
  *A63F 13/213* (2014.01)
  *G02B 27/01* (2006.01)
  *G06T 19/00* (2011.01)
  *A63F 13/42* (2014.01)

(52) U.S. Cl.
  CPC ......... *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 9,726,889 | B2 | 8/2017 | Gallery et al. |
| 2012/0014558 | A1 | 1/2012 | Stafford et al. |
| 2012/0142415 | A1* | 6/2012 | Lindsay ............... H04N 5/2224 463/33 |
| 2012/0249443 | A1 | 10/2012 | Anderson et al. |
| 2012/0281181 | A1 | 11/2012 | Chen et al. |
| 2013/0178287 | A1 | 7/2013 | Yahav |
| 2013/0232430 | A1 | 9/2013 | Reitan |
| 2014/0364212 | A1 | 12/2014 | Osman et al. |
| 2014/0364228 | A1 | 12/2014 | Rimon |
| 2015/0205106 | A1* | 7/2015 | Norden ................... G06F 3/012 345/7 |
| 2015/0352437 | A1 | 12/2015 | Koseki et al. |
| 2016/0195921 | A1* | 7/2016 | Evans ...................... G06F 3/02 297/217.3 |
| 2016/0350978 | A1 | 12/2016 | Mount et al. |
| 2017/0053442 | A1 | 2/2017 | Sumner et al. |
| 2017/0276943 | A1 | 9/2017 | Osman |
| 2017/0301181 | A9 | 10/2017 | Lyons et al. |
| 2018/0154253 | A1* | 6/2018 | Peterson ............... A63F 13/355 |

FOREIGN PATENT DOCUMENTS

| | | |
|---|---|---|
| WO | 2008024705 A2 | 2/2008 |
| WO | 2011109903 A1 | 9/2011 |
| WO | 2013049248 A2 | 4/2013 |
| WO | 2016168047 A1 | 10/2016 |

* cited by examiner

PRO GAMING AR VISOR AND METHOD FOR PARSING CONTEXT SPECIFIC HUD CONTENT FROM A VIDEO STREAM

FIELD

The application relates to professional gaming augmented reality (AR) visors and methods for parsing context-specific heads up display (HUD) content from a video stream.

BACKGROUND

Many video streams, especially those from a video game, contain peripheral supplemental data, information or images on screen. As not to interrupt or block the primary images and content being displayed, this supplemental information is typically displayed on a television or computer screen around the edges or perimeter of the primary video being shown. However, for example, during the play of a video game, requiring the user to take his eyes off of the primary screen content to view and decipher HUD content along the outskirts of the screen can be distracting. Indeed, while scanning perimeter-located content typically takes only seconds, present principles appreciate that in game play activity even short durations of distraction can result in untimely miscalculations, missed opportunities or other game play mistakes. Indeed, to ensure they see important but peripheral information, professional video game players train themselves to constantly divert their gaze to the screen edges at opportune periodicities using training metronomes.

SUMMARY

As understood herein, content appropriate for HUD content can be strategically extracted and displayed or superimposed over the primary viewing area through the use of a visor or display worn or positioned in front of the user, relieving the user from diverting his attention to other areas of the screen and creating a gameplay advantage for the user.

Present principles may also be used in applications other than competitive video game play. For example, dashboard displays of information, which otherwise divert the driver's attention from the road and operation of the vehicle, can be moved by a display apparatus that superimposes or otherwise displays the information from the dashboard to a safer HUD field of view.

Accordingly, a system includes at least one primary display configured to present video demanded by a computer game program. The system also includes at least one interpose display locatable between a computer gamer and the primary display. The interpose display is translucent. At least one computer storage that is not a transitory signal includes instructions executable by at least one processor to present augmented reality (AR) information from the computer game program on the interpose display. In this way the computer gamer can see the AR information in his line of sight as the computer gamer looks through the interpose display and sees on the primary display the video demanded by the computer game program.

In some examples, the interpose display is configured to be worn on the head of the computer gamer as, e.g., the visor of an AR headset. Or, wherein the interpose display may be configured like a pair of glasses. Yet again, the interpose display may be configured to be placed or mounted directly in an intended field of view of the computer gamer distanced from the computer gamer.

In example implementations, the instructions are executable to present on the interpose display user content, data and/or updates from video game play including one or more of: health/lives, time, score, weapons/ammunition, capabilities, menus, game progression, mini-map, speedometer/tachometer, context-sensitive information, reticle/cursor/crosshair, stealthometer, compass. The instructions may be executable to present on the interpose display one or more of content, data and/or updates important to operation of a device or vehicle, battery life, vehicle speed, oil levels, speed/speed limit, lane departure warnings, driving directions, alerts/car status messages, cruise control information, proximity car detections, road and/or weather conditions.

In some examples, the interpose display can include an inner surface and a touch sensitive outer surface facing the primary display, and the instructions are executable to move AR information presented on the interpose display in response to touches on the outer surface of the interpose display. In example embodiments, at least one camera may be presented on the interpose display and positioned to track an eye orientation of the computer gamer, with information from the camera being sent to a game console executing the computer game program for, e.g., establishing a computer game weapon aim line.

If desired, wherein the instructions can be executable to access code in the computer game program identifying the AR information, and using the code, present the AR information on the interpose display. In examples, the instructions are executable to receive signals from the computer game program representing motion of AR information, and based at least in part on the signals, to change at least one of: a color, a size, of the AR information on the interpose display.

In some implementations described in greater detail below, the instructions can be executable to, responsive to detecting communication between a communication component associated with the interpose display and at least one game console executing the computer game program, transfer AR information from the computer game program to the interpose display. In other implementations the instructions are executable to, responsive to at least one gamer-initiated voice or key press input command, send AR information from the computer game program to the interpose display.

In another aspect, a method includes presenting computer game video on a primary display according to a game program. The method also includes presenting information from the game program as augment reality (AR) information on a translucent display located between the primary display and a computer gamer.

In another aspect, a display assembly includes at least one translucent display and at least one computer storage with instructions executable by at least one processor to access code from a computer game program being executed to present video on a primary display separate from the translucent display. The instructions are executable to present on the translucent display information conveyed by the code.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
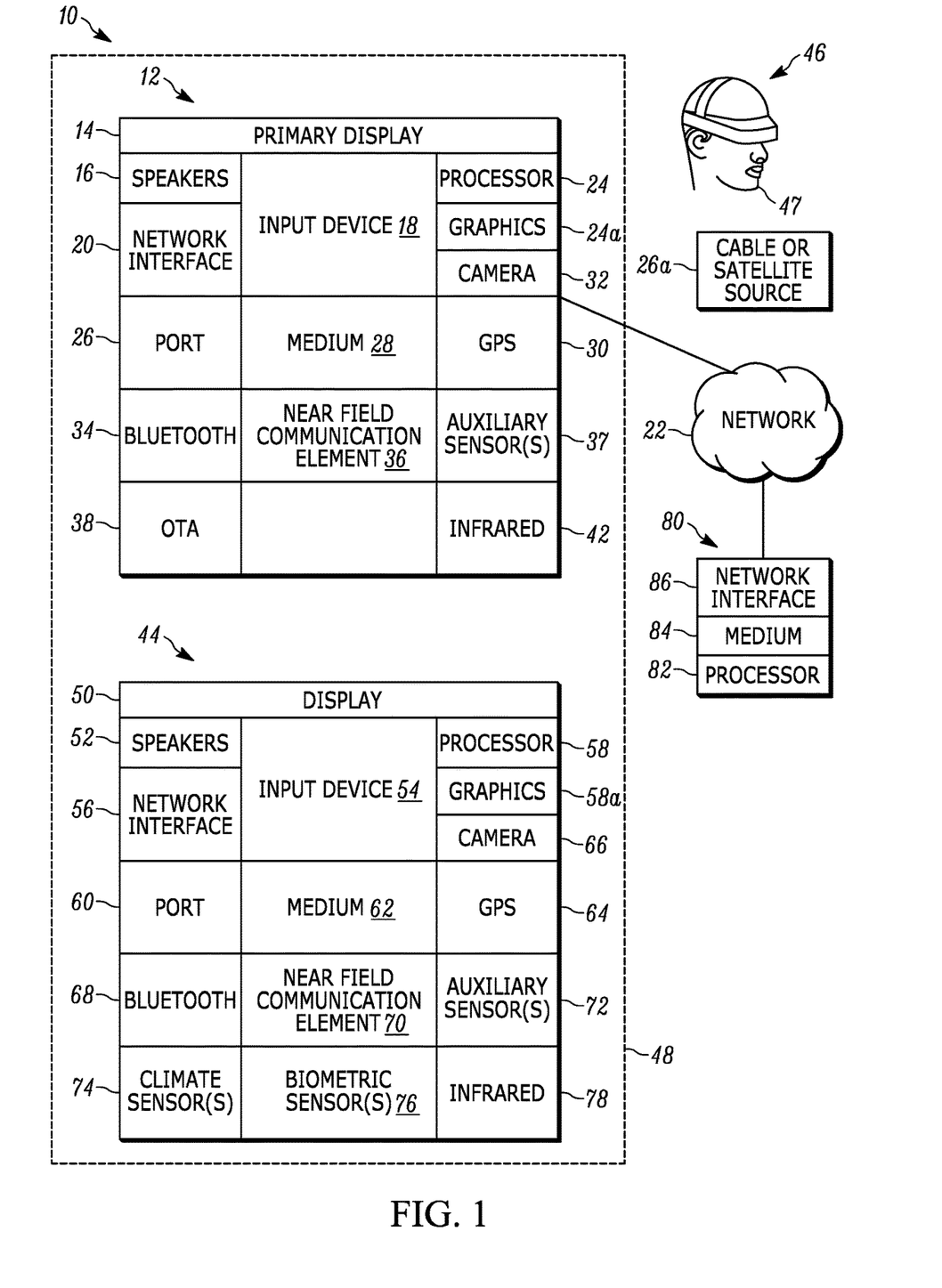
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
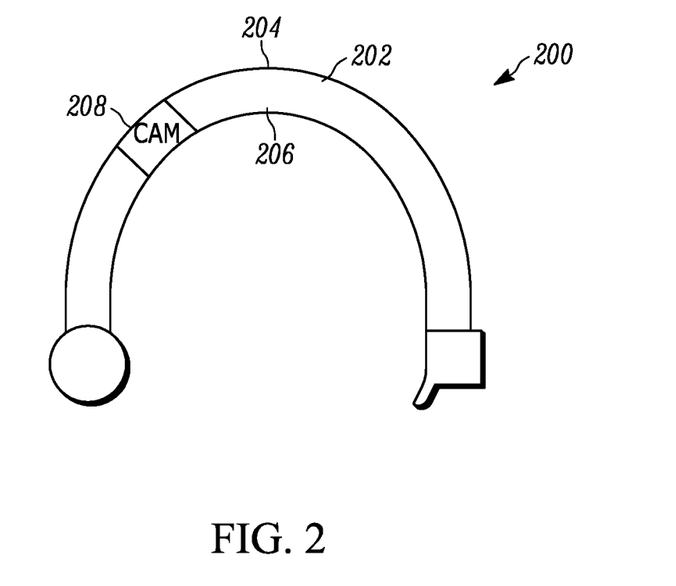
FIG. 2 is a top view of a translucent display configured as a "heads up display" (HUD) in a computer game headset configuration, showing some components schematically.
Figure 3:
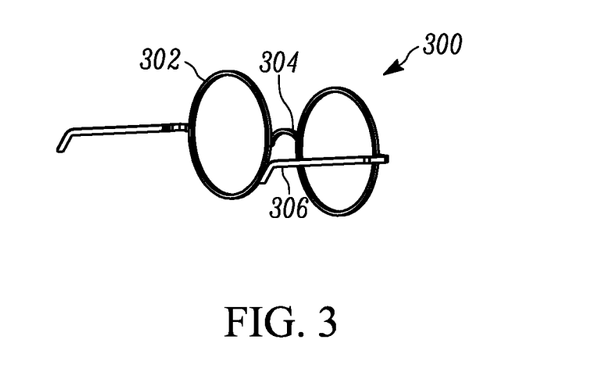
FIG. 3 is a perspective view of a translucent display configured as a HUD in an eyeglasses configuration.
Figure 4:
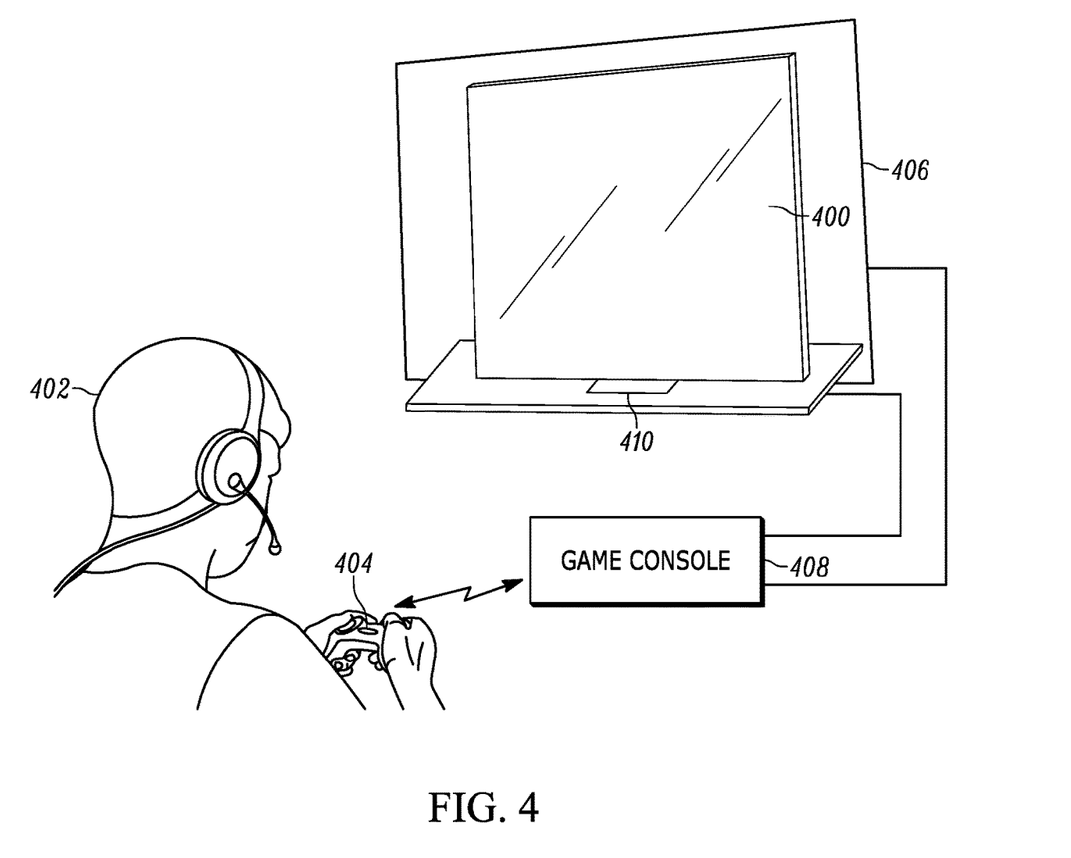
FIG. 4 is a perspective view of a translucent display configured as a standalone HUD that is not worn by a gamer but rather is disposed between the gamer and primary display, showing some components schematically, it being understood that components in any of the implementations of the HUD may be interchanged.

FIGS. 2-4 illustrate various translucent displays 200, 300, 400 that can be interposed between a viewer such as a computer gamer and a primary display on which is presented video such as a computer game video. The translucent displays 200, 300, 400 are thus examples of "heads up displays" (HUD) that present, as augmented reality (AR), ancillary information from the computer game file driving the game video on the primary display. Non-limiting examples of such AR information includes numeric representations of a game characters health/remaining lives, time, score, nature and amount of weapons/ammunition available, capabilities, game menus, game progression status, maps of the emulated topography in the game in miniature form, speedometer/tachometer gage associated with an emulated vehicle in the game, context-sensitive information, reticle/cursor/crosshair representations, a "stealthometer", a compass/quest arrow associated with emulated game geography. In motor vehicle applications the HUD content may include actual vehicle speed/speed limit associated with the road the vehicle is on, lane departure warnings, driving directions, alerts/car status messages, cruise control information, detection alerts of nearby vehicles, road and/or weather conditions.

The HUD 200 of FIG. 2 is configured as a head-wearable visor with a translucent display 202 with an outer surface 204 (i.e., the surface that faces away from the user when the visor is worn) and an inner surface 206. The outer surface may be touch-sensitive for reasons expanded on below. A microphone 208 may be provided on the HUD 200 to receive voice signals from the user for purposes discussed further below. The HUD 200, like the other HUDs herein, can include processors, computer storage, speakers, input keys, communication interfaces, and in general any of the appropriate components discussed above in reference to FIG. 1.

FIG. 3 illustrates a HUD 300 configured as eyeglasses, with left and right translucent displays 302 and a nose bridge 304 between the displays 302. Left and right temples 306 can extend from the displays to engage with a user's left and right ears.

FIG. 4 illustrates yet another HUD 400 configured not be worn on the head of a gamer 402 operating a game controller 404 but rather to be interposed between the gamer 402 and a primary display 406 as a standalone display. The primary display 406 may be implemented b any of the displays discussed herein, e.g., the display 14 in FIG. 1.

The controller 404 inputs game play signals to a computer game console 408 that produces demanded images from a computer game program on the primary display 406. As the gamer 402 operates the controller 404 to play the game presented on the primary display 406, the gamer looks through the translucent HUD 400 that is interposed between the gamer 402 and primary display 406 to view both the game video on the primary display 406 and AR information produced on the HUD 400 by means of, e.g., a projector 410 such as an ultra-short-throw (UST) projector mounted, e.g., on the stand on which the HUD 400 is supported as shown. It is to be understood that the other HUDs herein may employ projectors or other presentation techniques to present the AR information.

In addition to the various HUD configurations shown in FIGS. 2-4, a HUD may be configured to be worn across the body of the gamer in a manner that crosses the field of vision of the gamer.

Figure 5:
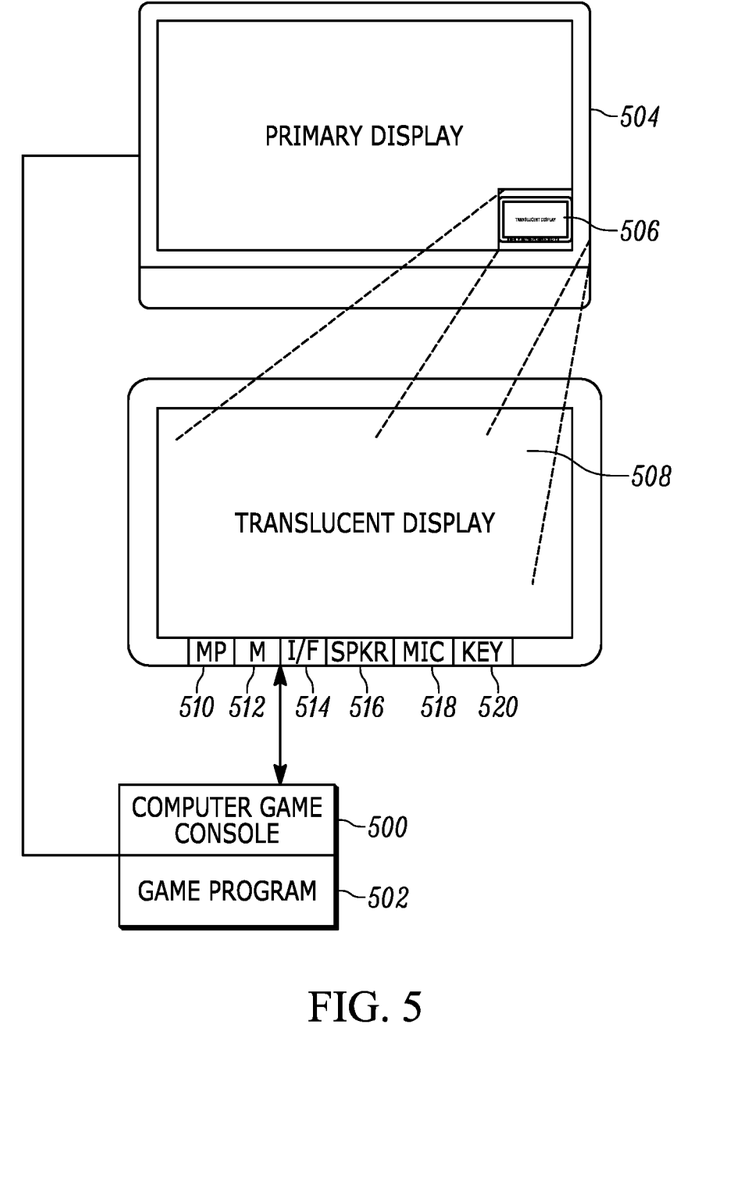
FIG. 5 is an elevational view showing a system that includes the primary display on which computer game video from a game console is shown, with information from the program executed by the console being sent to a translucent HUD.

FIG. 5 illustrates additional details of a HUD that is similar to the HUD 400 of FIG. 4. A computer game console such as but not limited to a Sony PlayStation® console or Microsoft Xbox® console can execute one or more computer game programs stored on data storage 502 of the console. The console 500 sends video demanded by the computer game program to a primary display 504. Typically, ancillary information such as any of the types of ancillary information described above is presented in a small region 506 of the primary display 504, such as a bottom left corner region in the example shown, which requires the gamer to divert his gaze from the main action in the video to the small region 506 and back again more or less constantly.

As illustrated in FIG. 5, however, in accordance with present principles the ancillary information in the small region 506 may be moved from the small region 506 of the primary display 504 to all or substantially all of the display region of a translucent HUD 508 as AR information. The ancillary information may be removed from the small region 506 of the primary display 504 when presented as AR information on the HUD, or it may remain in the small region in addition to being presented on the HUD.

If desired, a user may, via voice command or other input mode, select a frequency or timer setting at which AR content is presented on the HUD. The frequency may be initially established at a default frequency, with the frequency depending, if desired, on the type of AR content, e.g., a shorter frequency for messages and a longer frequency for a map. In such an embodiment, the AR content, such as the below-described map, remains on screen for a duration, disappears for a duration, and then reappears, cycling between appearing and disappearing at the frequency.

To illustrate various internal components the HUD may include, one or more processors 510 may access one or more computer storages 512 (that typically are not transitory signals) to execute present principles. Communication between, e.g., the HUD components and the game console 500 may be through one or more communication interfaces 514 such as a universal serial bus (USB) port or transceiver. Audio related to the game and more typically the AR information presented on the HUD may be played on one or more audio speakers 516. One or more microphones 518 may be provided to detected voice signals and send the voice signals to, e.g., the processor 510 for implementing voice recognition on the voice signals to generate commands as further described below. If desired, one or more manipulable keys 520 may be provided to input commands associated with the respective keys.

Figure 6:
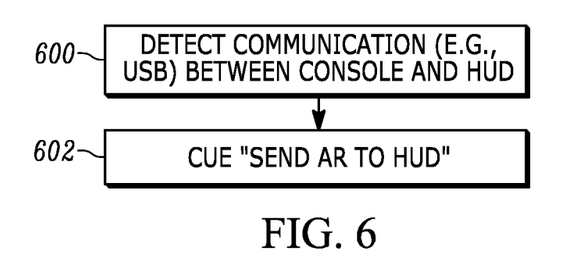
FIGS. 6-8 are flow charts of example logic for initializing AR information presentation on the HUD.
Figure 7:
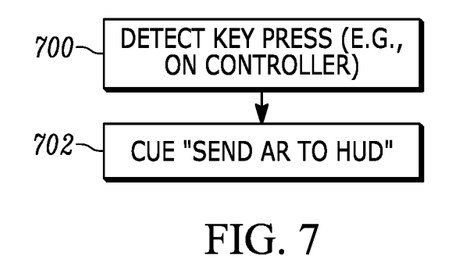
Figure 8:
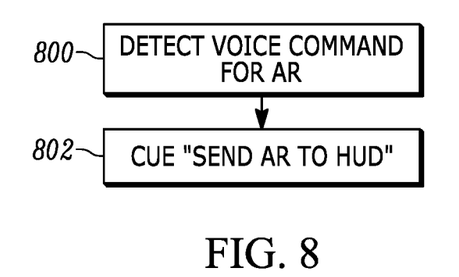

FIGS. 6-8 illustrate various techniques for initiating HUD presentation of AR information. At block 600 in FIG. 6, communication between the game console and HUD may be detected by one or both of the game console and the HUD. For example, plugging in a USB cable from the HUD to the game console may be detected, i.e., USB communication may be detected using hot pluggable communication principles. In response to detecting communication, at block 602 ancillary information that the game program commands to be presented in, e.g., the small region 506 of the primary display 504 in FIG. 5 can be sent from the game console to the HUD to cause the HUD to present the ancillary information as AR information, through which the gamer can look at the main action on the primary display while also seeing the AR information on the HUD without undue eye diversion.

On the other hand, in FIG. 7 at block 700 a manipulation of a predetermined key on the HUD or the game console or the game controller that correlates to "HUD presentation" may be received. In response, at block 702 ancillary information that the game program commands to be presented in, e.g., the small region 506 of the primary display 504 in FIG. 5 can be sent from the game console to the HUD to cause the HUD to present the ancillary information as AR information.

Yet again, FIG. 8 illustrates that at block 800 a voice command may be received by the HUD and/or game console and/or game controller to initiate HUD presentation. In response, at block 802 ancillary information that the game program commands to be presented in, e.g., the small region 506 of the primary display 504 in FIG. 5 can be sent from the game console to the HUD to cause the HUD to present the ancillary information as AR information.

Figure 9:
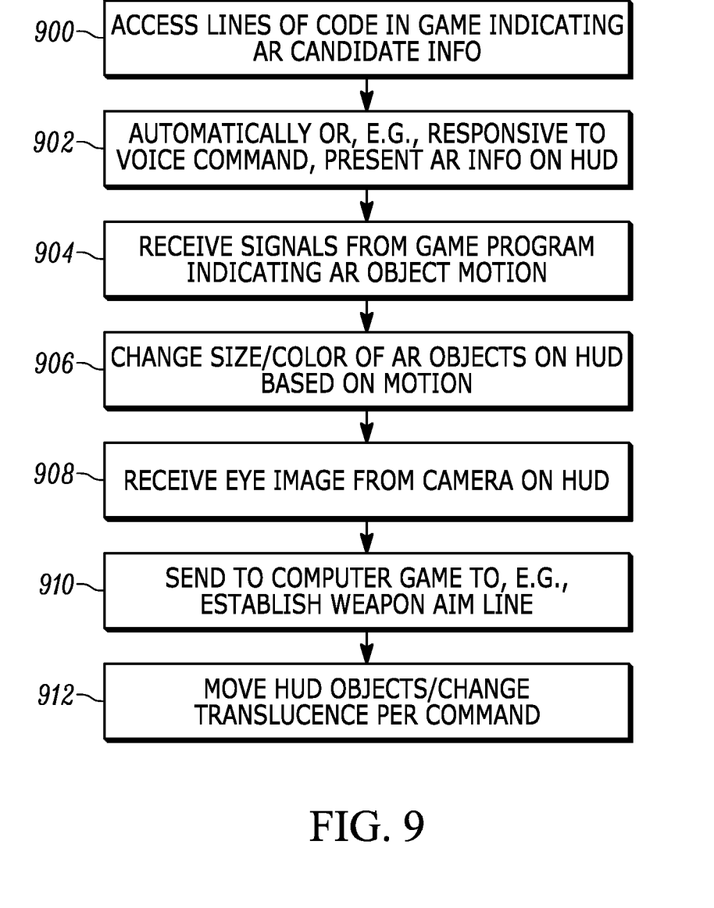
FIG. 9 is a flow chart of example logic for executing AR presentation on the HUD.

FIG. 9 illustrates example HUD AR presentation operating logic. The logic illustrated in FIG. 9 may be executed in whole or in part by the HUD processor or by any other processor or combination of processors disclosed herein. Commencing at block 900, lines of code in the computer game program are accessed which identify ancillary information that may be a candidate for being presented as AR information on the HUD. The lines of code may directly indicate the type of object a graphics object is, e.g., "tachometer" or "map" or "message", with the processor accessing a data structure of object types to determine whether type is correlated to an AR object. If it is, the lines of code representing the object are obtained from the computer game program and used to present the AR information on the HUD. Or, the lines of code may indicate a location on the primary display of a corresponding object. For example, the lines of code may indicate an object in the small region 506 of the primary display. Based on the code indicating a location of an object on the primary display that is correlated to AR information, the object is extracted from the computer game program and presented on the HUD.

Block 902 indicates that automatically, e.g., once communication with the game console is established and ancillary information identified as AR information according to principles above, or upon voice command or other user command, the ancillary information identified in block 900 is presented on the HUD as AR information. In some embodiments the ancillary information may be prioritized for presentation according to a predetermined prioritization, with only "N" AR objects being presented at once, wherein "N" is an integer equal to one or more. Or, a voice command representing the name of the object may cause the presentation of the commanded object. For example, the gamer may say "tach" to cause a tachometer to be presented, or "ammo" to cause a count of remaining ammunition to be presented on the HUD, or "lives" to cause a numeral representing lives remaining for the gamer's character to be presented on the HUD, or "map" to cause a map of the game geography to be presented on the HUD, and so on.

At block 904, signals may be received from the game program indicating that an AR object is moving, which may cause the presentation of the object on the HUD to change color or size at block 906 commensurate with the motion signal. As an example, if AR information includes certain game characters on the periphery of vision in the game, as the characters get closer to the emulated location of the gamer's character, the HUD presentation of the characters may increase in size, and/or change color, e.g., from green to red.

Recall that a camera, e.g., on the HUD, may be used to track the gamer's eye orientation. Block 908 indicates that information from the camera can be received and at block 910 sent to the game console executing the computer game program. In an example, the direction in which the gamer is looking is emulated in the game geography as an aim line for a weapon wielded by a character associated with the gamer, so that a gamer need only look at an object on the primary display, for example, and press a key indicating a weapon shot to cause the weapon to fire along the aim line established by the gaze of the gamer.

Figure 10:
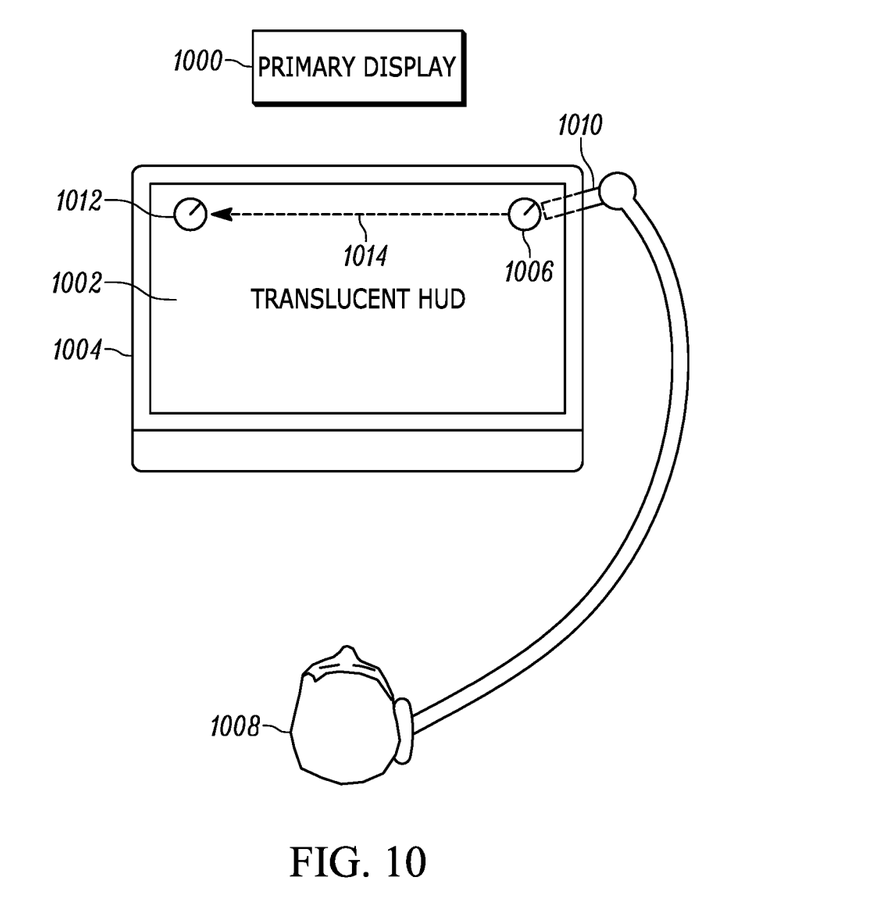
FIGS. 10-12 are schematic diagrams illustrating example HUD control modes consistent with present principles.
Figure 11:
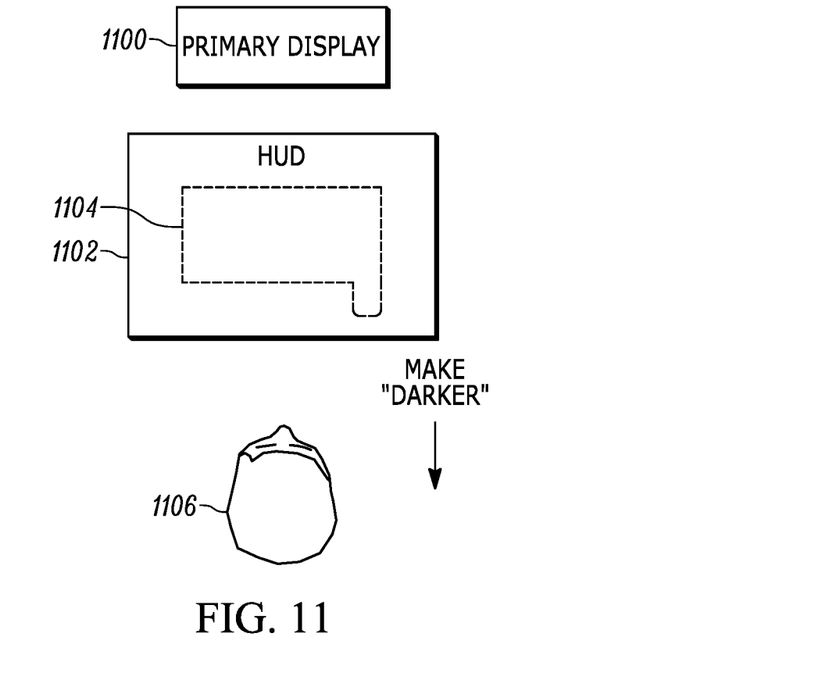
Figure 12:
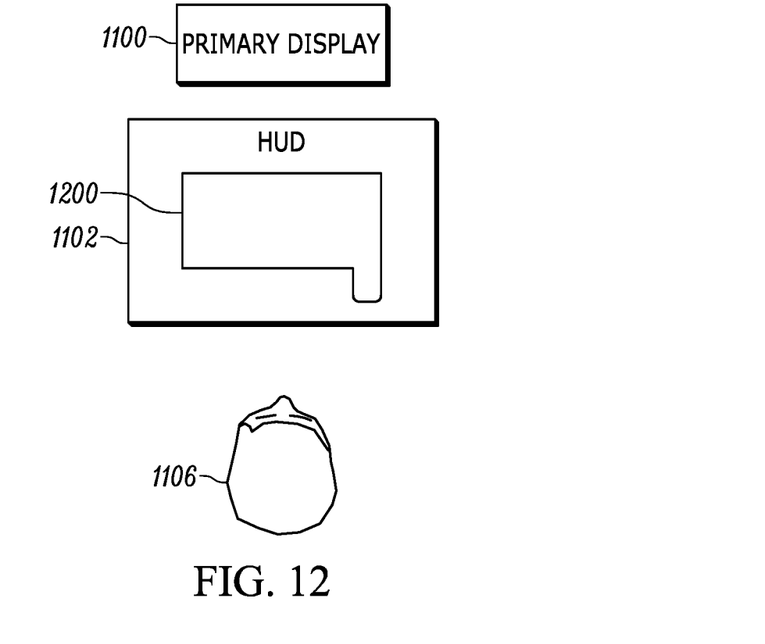

Block 912 indicates that AR information presented on the interpose display can be moved in response to, e.g., touch on the outer surface of the HUD. Block 912 also indicates that the translucence of the HUD may be changed according to gamer command. FIGS. 10-12 illustrate.

In FIG. 10, a primary display 1000 is shown behind a translucent HUD 1002 having a touch sensitive surface 1004 that faces the primary display. AR information 1006 is presented on the HUD. A gamer 1008 who looks through the HUD to the primary display can move the AR information 1006 by moving a finger 1010 against the touch sensitive side 1004 of the HUD to a new location 1012, as indicated by the arrow 1014. Note that the AR content may also move responsive to voice commands, e.g., "move the tach left".

FIGS. 11 and 12 illustrate a primary display 1100 and HUD 1102 according to previous principles, with the AR information presented on the HUD 1102 including a map 1104. A gamer 1106 looks at the map and through the HUD to the primary display 1100 according to principles above.

Should the gamer wish to reduce the translucence of the HUD by, e.g., making the map 1104 appear darker, the gamer may issue a voice command such as "make darker", to cause the map to assume a more heavily outlined or darker version 1200 as shown in FIG. 12. Other use cases include gamer voice commands to "lighten display", which increases the overall translucence of the HUD, or "lighten map" or "lighten AR", which reduces the darkness of the AR information and thus increases HUD translucence. Another example of AR content that may be presented on the HUD includes incoming messages. Thus, while the user is playing a game and a message comes in, the message may scroll or otherwise be displayed on the HUD. Messages may be from the console from other users or from a connected external device (cell phone via Bluetooth, BLE, Wi-Fi etc.)

It will be appreciated that whilst present principals have been described with reference to some example embodiments, these are not intended to be limiting, and that various alternative arrangements may be used to implement the subject matter claimed herein.

What is claimed is:

1. An apparatus, comprising:
at least one processor configured with instructions to:
present, on an interpose display that is translucent or transparent, augmented reality (AR) information from a computer game program being presented on a primary display, whereby the computer gamer can see the AR information as the computer gamer looks through the interpose display and sees on the primary display the video demanded by the computer game program.

2. The apparatus of claim 1, wherein the interpose display is configured to be worn on the head of the computer gamer.

3. The apparatus of claim 1, wherein the instructions are executable to identify candidate AR information by object type.

4. The apparatus of claim 1, wherein the instructions are executable to indicate a location on the primary display of a corresponding object to be shown in the interpose display.

5. The apparatus of claim 1, wherein the instructions are executable to present an AR object on the interpose display responsive to voice input.

6. The apparatus of claim 1, wherein the instructions are executable to alter a visual attribute of an object on the interpose display responsive to movement of a player wearing the interpose display.

7. The apparatus of claim 1, wherein the instructions are executable to move an AR object presented on the interpose display responsive to touch on the interpose display.

8. The apparatus of claim 1, wherein the instructions are executable to change translucence of the interpose display responsive to voice input.

9. The apparatus of claim 1, wherein the interpose display comprises an inner surface and an outer surface facing the primary display, the outer surface being touch sensitive, and the instructions are executable to:
move AR information presented on the interpose display in response to at least one touch on the outer surface of the interpose display.

10. The apparatus of claim 1, comprising at least one camera on the interpose display positioned to track an eye orientation of the computer gamer, information from the camera being sent to a game console executing the computer game program.

11. The apparatus of claim 1, comprising at least one game console executing the computer game program.

12. The apparatus of claim 1, wherein the instructions are executable to:
access code in the computer game program identifying the AR information; and
using the code, present the AR information on the interpose display.

13. The apparatus of claim 1, wherein the instructions are executable to:

receive signals from the computer game program representing motion of AR information; and based at least in part on the signals, change at least one of: a color, a size, of the AR information on the interpose display.

14. The apparatus of claim 1, wherein the instructions are executable to:

responsive to detecting communication between a communication component associated with the interpose display and at least one game console executing the computer game program, transfer AR information from the computer game program to the interpose display.

15. The apparatus of claim 1, wherein the instructions are executable to:

responsive to at least one gamer-initiated input command, send AR information from the computer game program to the interpose display.

16. The apparatus of claim 1, wherein the instructions are executable to:

present at least a portion of an image on the primary display; and establish the AR information on the interpose display using the portion of the image on the primary display.

17. An apparatus comprising:

at least one processor configured with instructions executable to:

present on a transparent or translucent interpose display augmented reality (AR) information from a computer game program presented on a primary display, whereby the AR information is visible on the interpose display and is visibly overlaid on video demanded by the computer game program being presented on the primary display.

18. The apparatus of claim 17, wherein the instructions are executable to present on the interpose display user content, data and/or updates from video game play including one or more of: health/lives, time, score, weapons/ammunition, capabilities, menus, game progression, mini-map, speedometer/tachometer, context-sensitive information, reticle/cursor/crosshair, stealthometer, compass.

19. The apparatus of claim 17, wherein the interpose display comprises an inner surface and an outer surface facing the primary display, the outer surface being touch sensitive, and the instructions are executable to:

move AR information presented on the interpose display in response to touches on the outer surface of the interpose display.

20. A method comprising:

presenting on an interpose display augmented reality (AR) information from a computer game program being presented on a primary display, the interpose display being located between a computer gamer and the primary display, the interpose display being translucent or transparent, whereby the AR information is visible on the interpose display as being overlaid on the primary display.

* * * * *